United States Patent [19]

Shoop

[11] Patent Number: 5,180,205
[45] Date of Patent: Jan. 19, 1993

[54] TRAILER ASSEMBLY AND METHOD

[76] Inventor: Ralph E. Shoop, RD #1 Box 251, Ashland, Pa. 17921

[21] Appl. No.: 657,711

[22] Filed: Feb. 18, 1991

Related U.S. Application Data

[63] Continuation-in-part of Ser. No. 502,243, May 21, 1990, abandoned.

[51] Int. Cl.$^5$ .......................... B60P 1/00; B62D 35/00
[52] U.S. Cl. .................................. 296/181; 296/180.4
[58] Field of Search ..................... 296/181, 168, 180.4, 296/180.1, 164, 26, 172, 176, 180.5

[56] References Cited

U.S. PATENT DOCUMENTS

| | | | |
|---|---|---|---|
| 1,880,844 | 10/1932 | Curtiss | 296/181 |
| 3,390,896 | 7/1968 | Philapy | 296/168 X |
| 3,415,566 | 12/1968 | Kerrigan | 296/180.4 |
| 3,817,545 | 6/1974 | Ward | 296/168 X |
| 4,170,378 | 10/1979 | Jacobsen | 296/180.4 |
| 4,640,544 | 2/1987 | McNamara et al. | 296/181 |
| 4,818,015 | 4/1989 | Scanlon | 296/180.4 X |

FOREIGN PATENT DOCUMENTS

| | | | |
|---|---|---|---|
| 3408947 | 2/1986 | Fed. Rep. of Germany | 296/156 |
| 2434052 | 4/1980 | France | 296/180.4 |
| 2466381 | 4/1981 | France | 296/168 |
| 2481666 | 11/1981 | France | 296/180.4 |

Primary Examiner—Johnny D. Cherry
Assistant Examiner—Joseph D. Pape
Attorney, Agent, or Firm—James F. Duffy

[57] ABSTRACT

An improvement on a towing assembly of a 5th wheel trailer and a pick-up truck which has a 5th wheel hitch in its bed. The improvement is a tapered, streamlined, aerodynamic extension at the front of the 5th wheeler trailer. In addition to reducing the power required to tow the trailer, increasing the fuel efficiency of the towing assembly, greatly increasing the towed stability of the trailer; the improvement adds to the storage and sleeping space available to users of the trailer. Access to the extension is available through a separate exterior access door as well as through the original front window opening of the trailer. The improvement is useful for both retrofit and original equipment purposes.

7 Claims, 2 Drawing Sheets

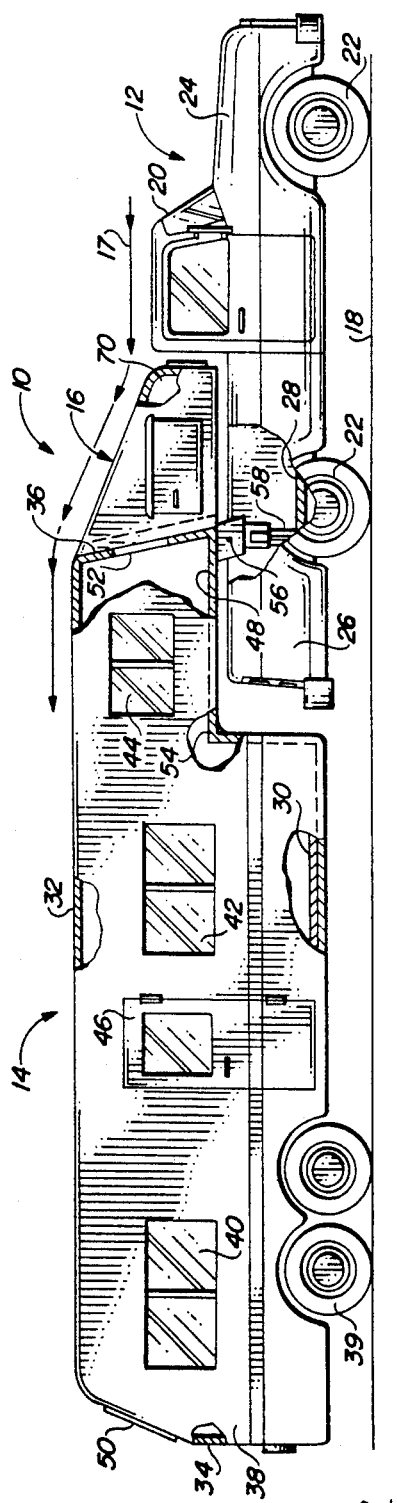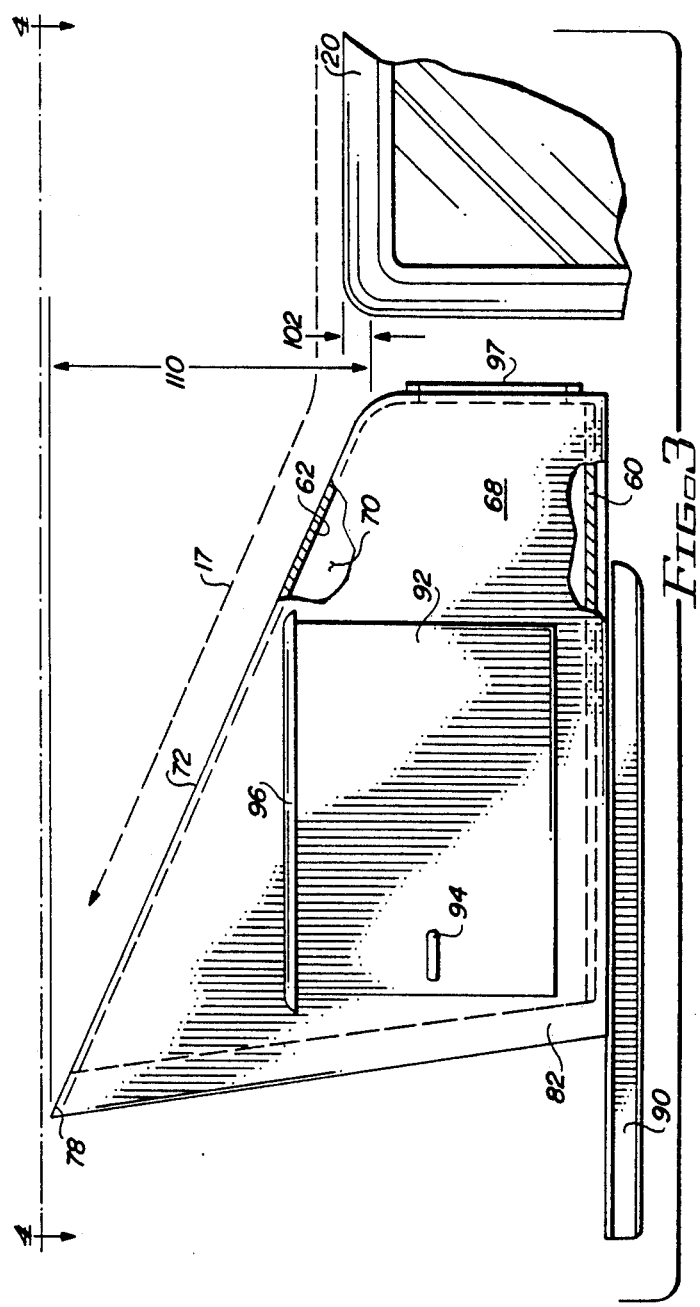

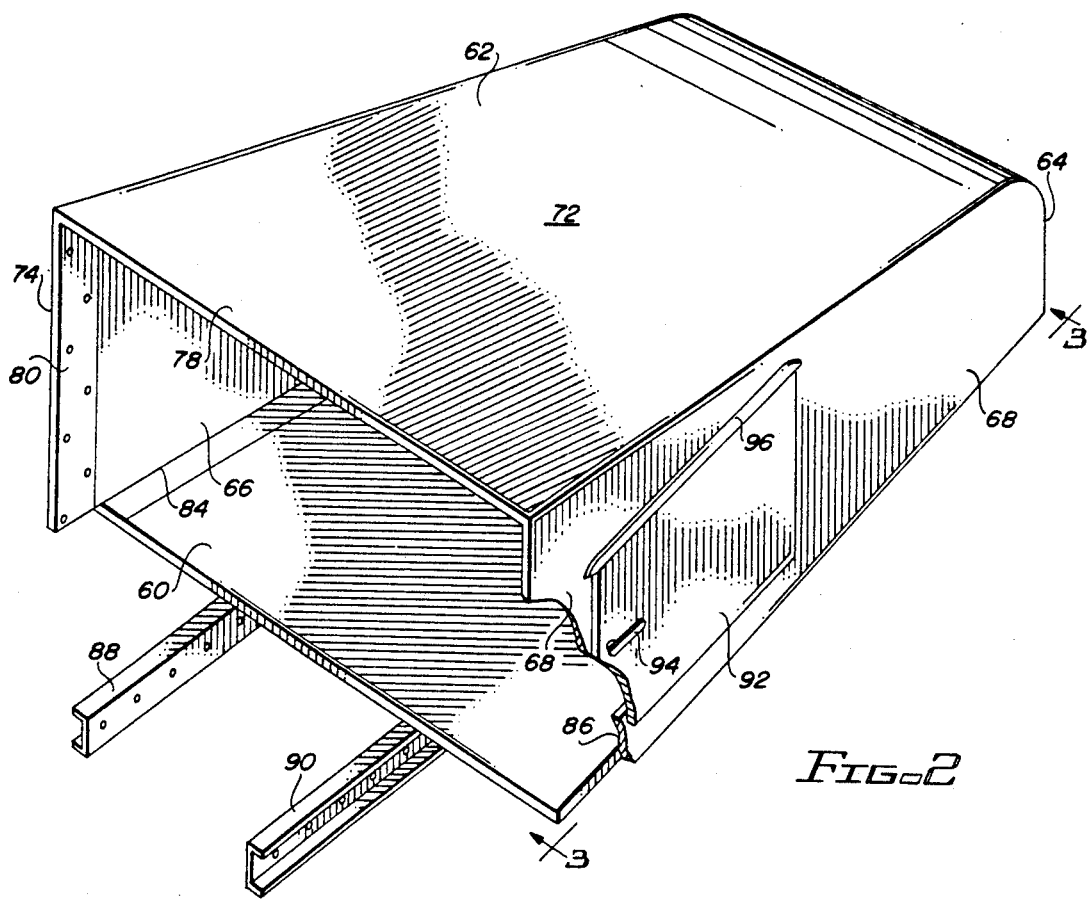
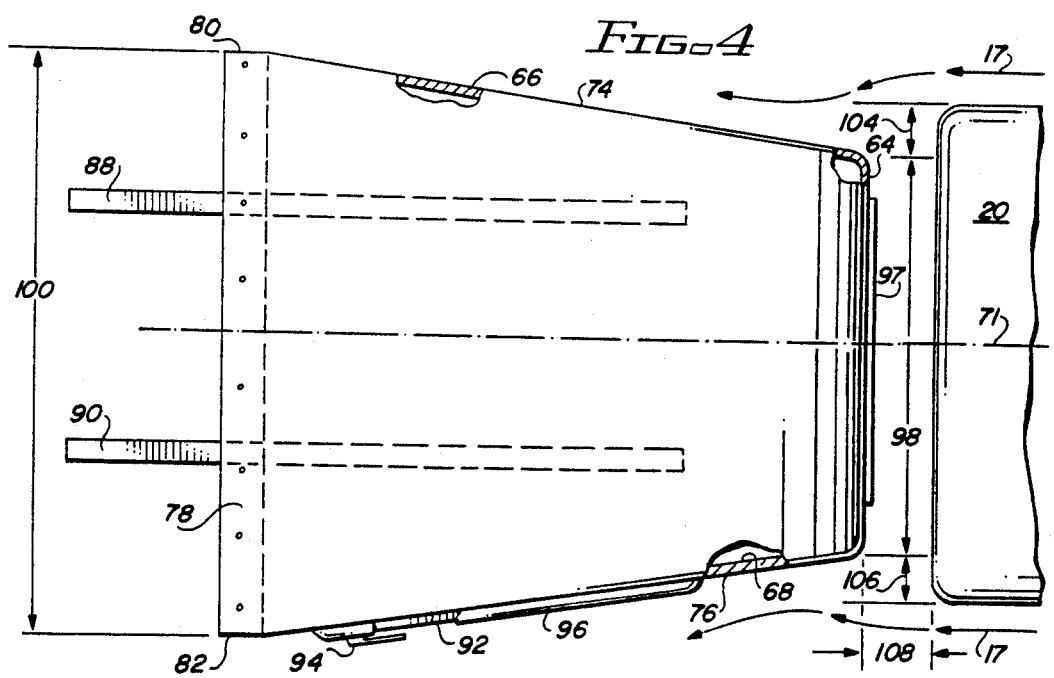

TRAILER ASSEMBLY AND METHOD

RELATED PATENT APPLICATION

This is a continuation-in-part to my previously filed U.S. patent application Ser. No. 07/502,243; filed May 21, 1990, now abandoned.

FIELD OF THE INVENTION

The invention generally relates assembly and method, and in particular the invention relates to a trailer assembly having a pickup truck and a trailer with a cantilevered aerodynamically shaped enclosed chamber disposed behind a cab of the pickup truck.

BACKGROUND OF THE INVENTION

The prior art trailer assembly is described in U.S. Pat. No. 4,127,299, issued Nov. 28, 1987.

U.S. Pat. No. 4,127,299 describes a trailer assembly including a pickup truck and a camper hitched thereto.

One problem with the prior art trailer assembly is that wind pressure on the front of the camper during travel causes an aerodynamic drag on the camper which results in an added fuel consumption.

Related patents include U.S. Pat. Nos. 4,775,179, issued Oct. 4, 1988; 4,707,015, issued Nov. 17, 1987; 4,629,241, issued Dec. 26, 1986; 4,560,195, issued Dec. 24, 1985; 4,269,444, issued May 26, 1981; 2,974,999, issued May 29, 1957; German Patent DE 3249376A1, published Sep. 27, 1984, and U.K. Patent 2,065,179, published Jun. 24, 1981.

U.S. Pat. No. 4,775,179 describes an aerodynamically shaped sleeper apparatus mounted on a trailer truck and attached behind the truck cab.

U.S. Pat. No. 4,707,015 describes an inflatable air deflector having a sheet with a frame support mounted on the front wall of a trailer and having an aerodynamic outer surface.

U.S. Pat. No. 4,629,241 describes a wedge shaped structure fixedly connected to a trailer front wall and extending over the truck cab and having an aerodynamic outer surface.

U.S. Pat. No. 4,560,195 describes an inflatable air deflector having a flexible sheet with a perimeter attached to the front wall of a trailer and having an aerodynamic outer surface.

U.S. Pat. No. 4,269,444 describes a trailer portion having an aerodynamic outer surface for giving a degree of lift to the trailer.

U.S. Pat. No. 2,974,999 describes an automobile transport vehicle having an open framework with a flexible cover and having a front end portion extending over the truck cab.

German Patent DE 3249376A1 describes a car having a roof portion with a hitch and a camper having an aerodynamically shaped front end portion extending above and over the roof of the car.

U.K. Patent 2,065,047A describes a trailer and truck having an aerodynamically shaped inflatable member mounted above the truck cab and in front of the trailer.

One object of the present invention is to provide a trailer assembly and method to minimize aerodynamic drag on a front end of a camper or trailer due to aerodynamic drag during travel.

Another object of the invention is to provide a trailer assembly and method to minimize fuel consumption caused by aerodynamic drag.

A further object is to provide a trailer assembly and method having an enclosed chamber for sleeping or storage purposes.

The foregoing and other objects, features and advantages will be apparent from the following description of the preferred embodiment of the invention as illustrated in the accompanying drawings.

SUMMARY OF THE INVENTION

It is a primary intention of the invention to streamline and make aerodynamic 5th wheeler R.V. trailers. This is achieved by coupling to the front end of a 5th wheeler trailer a streamlined, aerodynamically shaped extension which occupies the space between the trailer and the cab of the pick-up truck. The 5th wheeler hitch by which the trailer is towed is installed centrally in the bed of the truck.

The extension fits close behind the cab of the pick-up truck. The extension has a taper which starts at or near the point of coupling to the front of the 5th wheeler trailer and terminates immediately behind the pick-up's cab. At its nearest approach, the extension is slightly lower and narrower than the cab's dimensions.

The taper of the extension has two purposes: It creates a smooth air flow up, over, and away from the front of the trailer; and, it provides a clearance between the truck and the extension so that the truck can make a 90 degree turn while towing the 5th wheeler trailer.

The extension is enclosed to create additional storage or sleeping space. Access is through a door in the side of the extension as well as through the large front window with which such 5th wheeler trailers are typically equipped. The extension can be manufactured for installation on existing 5th wheeler trailers or incorporated as part of the original equipment at the time of manufacture.

Herein, the invention is claimed as an improvement in the combination of a pick-up truck having a 5th wheel hitch in its cargo bed and a 5th wheeler recreational vehicle trailer having a front end which extends above the cargo bed for coupling with the 5th wheel hitch. The trailer is thereafter towed by the pick-up truck. The 5th wheel hitch being conventionally positioned above the rear wheels of the truck, the coupling of the front end of the trailer with the hitch positions the front end a significant distance behind the cab of the truck. This produces a void behind the cab, the void causing a disruption of air flow between the cab and the front of the trailer. The disruption of air flow requires more towing power from the truck at poorer fuel efficiency.

The improvement comprises extension means coupled to the trailer for extending the front end in a tapered configuration above the truck bed toward the truck cab. The extension means generally occupies the void so as to produce a generally streamlined air flow past the cab and over the trailer, thereby reducing the towing power requirement and increasing fuel economy.

In a presently preferred embodiment, the extension means has a front face adjacent to the rear of the cab. The front face has a smaller cross section than that of the rear of the cab. Thus, air flows smoothly past the cab and over the extension means. There is also a selected clearance dimension between the front face of the extension means and the rear of the cab whereby the truck may turn an angle of 90 degrees relative to the trailer free of contact with the extension means.

Preferably, the extension means comprises an enclosed interior when coupled to the trailer. The enclosed interior is suitable for storage and/or sleeping. Usually, the trailer has a front window opening. The front window opening becomes an access port to the enclosed interior of the extension. The extension means further includes exterior access means for providing access to the enclosed interior.

The invention is also claimed as a method for reducing airflow disruptions and producing streamlined air flows between the cab of a pick-up truck and the front end of a 5th wheeler recreational vehicle trailer. As before, the truck has a 5th wheel hitch in its bed for coupling to and towing the 5th wheeler trailer. The method comprises the steps of a. constructing a tapered extension and coupling it to the front end of a 5th wheeler trailer;
b. extending the tapered extension above the bed of the pick-up truck having a 5th wheel hitch for towing the trailer;
c. terminating the tapered extension in a front face adjacent the rear of the cab of the truck; and
d. sizing the cross section of the front face to be less than that of the rear of the cab, where, by reason of the tapering of the extension and the adjacency of its front face to the rear of the cab, air flows smoothly past the cab and over the tapered extension and the trailer.

The method further comprising the steps of:
e. constructing the tapered extension to provide an enclosed interior thereto when coupled to the front end of the 5th wheeler trailer; and
f. using the enclosed interior for at least one of storage and sleeping.

Product-by-process claims are laid to the tapered extension produced in the practice of the method of the invention.

BRIEF DESCRIPTION OF DRAWINGS

FIG. 1 is an elevation view of a 5th wheeler trailer and pick-up truck assembly according to the present invention wherein an aerodynamic extension has been coupled to the front of the trailer;

FIG. 2 is a perspective view of a portion of the trailer assembly of FIG. 1;

FIG. 3 is an elevation view of the extension as taken along the line 3—3 of FIG. 2; and FIG. 4 is a plan view of the extension as taken along the line 4—4 of FIG. 3.

DESCRIPTION OF THE PREFERRED EMBODIMENT

As shown in FIG. 1, a vehicle and trailer assembly 10 is provided. Assembly 10 has a pickup truck 12 and a recreation vehicle, 5th wheeler trailer 14. This invention is a cantilevered structure or enclosed chamber or extension 16 over which a smooth air flow 17 occurs during travel for minimizing aerodynamic drag on the camper 14.

Truck 12, which rests on ground 18, has a cab 20, a plurality of wheels 22, a front engine portion 24, and a rear bed portion 26, which has a bed plate 28, Trailer 14 has a lower wall or floor 30, an upper wall or roof 32, a rear wall 34, a front wall 36, a leftside wall (not shown), a rightside wall 38, and a plurality of wheels 39. Rightside wall 38 three slide-type windows 40, 42, 44 and has a door 46.

Floor 30 has a raised floor portion 48, which is disposed next to front wall 36. Rear wall 34 has a window 50. Front wall 36 has an opening or window 52. Floor 30 has a Z-shaped steel framework 54, which is part of a rigidly connected post 56. Post 56 has a conventional 5th wheeler hitch unit 58 which connects to bed plate 28. This assembly of hitching the front end of a trailer to a hitch in the bed of a pick-up truck was probably first disclosed by J.E. Philapy in U.S. Pat. No. 3,390,896 issued Jul. 2, 1968. It is popularly referred to as a 5th wheel hitch. The trailer utilizing such a hitch is referred to herein as "a 5th wheeler trailer."

The details of a prototype extension 16 constructed by the inventor are illustrated in FIGS. 2-4.

As shown in FIGS. 2, 3 and 4, extension 16 has a bottom wall 60 which is flat, a top wall 62, a forward wall 64, a leftside wall 66, and a rightside wall 68, which enclose a chamber 70.

Top wall 62 and leftside wall 66 and rightside wall 68 and forward wall 64 are formed together as a one-piece molded plastic unit, with window openings as required. Top wall 62 tapers upwardly in a rearward direction. Side walls 66, 68 taper outwardly in a rearward direction, relative to a longitudinal symmetry axis 71. Tapered walls 62, 66, 68 have respective tapered outer surfaces 72, 74, and 76. Walls 62, 66, 68 have respective edge portions 78, 80, 82, which are connected to respective camper top wall 32, and camper leftside wall (not shown) and camper rightside wall 38.

Bottom wall 60, which is a plywood sheet, has a left edge corner piece 84 and a right edge corner piece 86. Pieces 84, 86 are 2 inch by 2 inch elongate wood members. Pieces 84, 86 are rigidly connected to bottom wall 60, and each is rigidly connected to its side wall 66 or 68. Bottom wall 60 has a left channel 88, and a right channel 90 which, at their rearward ends, are fixedly connected to camper framework 54, by bolts or the like. Channels 88, 90 support bottom wall 60, and are supported by framework 54. Rightside wall 68 has an access door 92, which has a door handle 94, and has a drip cap 96. Forward wall 64 has a window 97.

As shown in FIGS. 3 and 4, tapered side surfaces 74, 76 are separated by a width dimension 98, which is about 5 feet at the forward end of extension 16. Surfaces 74, 76 are separated by a width dimension 100, which is about 8 feet at the rearward end of extension 16. Top surface 72 is below and is separated form a top surface of cab 20 by a height dimension 102, which is about 2 inches. Left and right surfaces 74, 76 at their forward ends are recessed and have respective dimensions 104, 106 which are each about 2 inches. Thus, the transverse projected view of forward wall 64 is less than the corresponding transverse projected view of cab 20. Forward wall 64 has a clearance dimension 108, which is sufficiently large enough to permit a maximum turning angle of 90 degrees of truck 12 relative to camper 14 about hitch unit 58, without contact of forward wall 64 and cab 20. Top wall 62, which slopes or tapers upwardly in a rearward direction has a rise dimension 110 of about 14 inches.

Due to the shape, dimensions and arrangement of extension 16, a smooth air flow 17 occurs along the outer surfaces 72, 74, 76 of extension 16 and the adjacent corresponding surfaces of sub portion 20 and camper 14.

It is to be understood that the specific details of the construction of the prototype extension 16 set out above have been presented by way of exposition and are not to be considered as limitations on the manner in which the invention is made or specifically configured. It is intended that an after-market extension can be produced for retrofitting on existing 5th wheeler trailers. At the same time, it is anticipated that an original equipment manufacturer of the subject trailers will incorporate the invention in the course of manufacture of the trailers.

The advantages of trailer assembly 10 14 outfitted with extension 16 are indicated hereafter.
A) Air dynamic drag on trailer assembly 10 is minimized.
B) The hazard of overturning trailer assembly 10 due to wind gusts is minimized.
C) The power expended for towing camper 14 is minimized.
D) Fuel consumption for driving truck 12 is minimized.
E) An enclosed chamber for sleeping or storage purposes is provided.

While the invention has been described in its preferred embodiment, it is to be understood that the words which have been used are words of description rather than limitation and that changes may be made within the purview of the appended claims without departing from the time scope and spirit of the invention in its broader aspects.

The embodiments of an invention in which an exclusive property or right is claimed are defined as follows:

1. In the combination of a pick-up truck having a 5th wheel hitch in its cargo bed and a 5th wheeler recreational vehicle trailer having a front end which extends above said cargo bed for coupling with said 5th wheel hitch to
   be thereafter towed by said pick-up truck, said 5th wheel hitch being conventionally positioned above the rear wheels of said truck, said coupling of said front end of said trailer with said hitch positioning said front end a significant distance behind the cab of said truck to produce a void behind said cab, said void producing a disruption of air flow between said cab and said front of said trailer, said disruption of air flow requiring more towing power from said truck at poorer fuel efficiency, the improvement comprising:
   extension means coupled to said trailer for extending said front end in a tapered configuration above said truck bed toward said truck cab and generally occupying said void for producing a generally streamlined air flow past said cab and over said trailer thereby reducing said towing power requirement and increasing fuel economy; and
   said extension means having a front face adjacent to the rear of said cab, said front face having a smaller cross section than that of the rear of said cab, whereby air flows smoothly past said cab and over said extension means.

2. The improvement of claim 1 further comprising a selected clearance dimension between said front face of said extension means and the rear of said cab whereby said truck may turn an angle of 90 degrees relative to said trailer free of contact with said extension means.

3. The improvement of claim 1 wherein said extension means comprises an enclosed interior when coupled to said trailer, said enclosed interior being suitable for at least one of storage and sleeping.

4. The improvement of claim 3 wherein said trailer has a front window opening, said front window opening being an access port to said enclosed interior of said extension.

5. The improvement of claim 3 said extension means further comprising access means for providing access to said enclosed interior.

6. A method for reducing airflow disruptions and producing streamlined air flows between the cab of a pick-up truck and the front end of a 5th wheeler recreational vehicle trailer, said truck having a 5th wheel hitch in the bed of the truck for coupling to and towing said 5th wheeler trailer, said method comprising the steps of:
   constructing a tapered extension and coupling it to the front end of a 5th wheeler trailer;
   extending said tapered extension above the bed of the pick-up truck having a 5th wheel hitch for towing said trailer;
   terminating said tapered extension in a front face adjacent the rear of the cab of said truck; and
   sizing the cross section of said front face to be less than that of the rear of said cab,
   where, by reason of the tapering of said extension and the adjacency of its front face to the rear of said cab, air flows smoothly past said cab and over said tapered extension and said trailer; and
   constructing said tapered extension to provide an enclosed interior thereto when coupled to the front end of said 5th wheeler trailer; and
   using said enclosed interior for at least one of storage and sleeping.

7. The tapered extension produced by practice of the method of claim 6.

* * * * *